United States Patent [19]
Bainton

[11] 3,762,088
[45] Oct. 2, 1973

[54] SWALLOW-TAIL FISH LURE
[76] Inventor: Byron L. Bainton, 360 Taylor Ave., Renton, Wash. 98055
[22] Filed: June 23, 1972
[21] Appl. No.: 265,587

[52] U.S. Cl. ................................. 43/42.5
[51] Int. Cl. ........................... A01k 85/00
[58] Field of Search ........................ 43/42.5

[56] References Cited
UNITED STATES PATENTS
| | | | |
|---|---|---|---|
| D193,789 | 10/1962 | Elrod | 43/42.5 UX |
| 2,511,002 | 6/1950 | Perry | 43/42.5 |
| 2,758,408 | 8/1956 | Murphy et al. | 43/42.5 X |
| D172,814 | 8/1954 | Bayer | 43/42.5 X |

Primary Examiner—Hugh R. Chamblee
Attorney—Ford E. Smith

[57] ABSTRACT

A fish lure is disclosed to comprise a body portion having a forwardly located downturned head portion, a bifurcated, swallow-tail, trailing portion all being formed of a single piece of sheet material and all arranged symmetrically along the longitudinal axis of the lure. In the preferred form the swallow-tail divergent portions are rotated relative the lure's axis so that the inner edges are lower than the respective outer edges. This abstract is neither intended to define nor to delimit the invention in any way.

2 Claims, 11 Drawing Figures

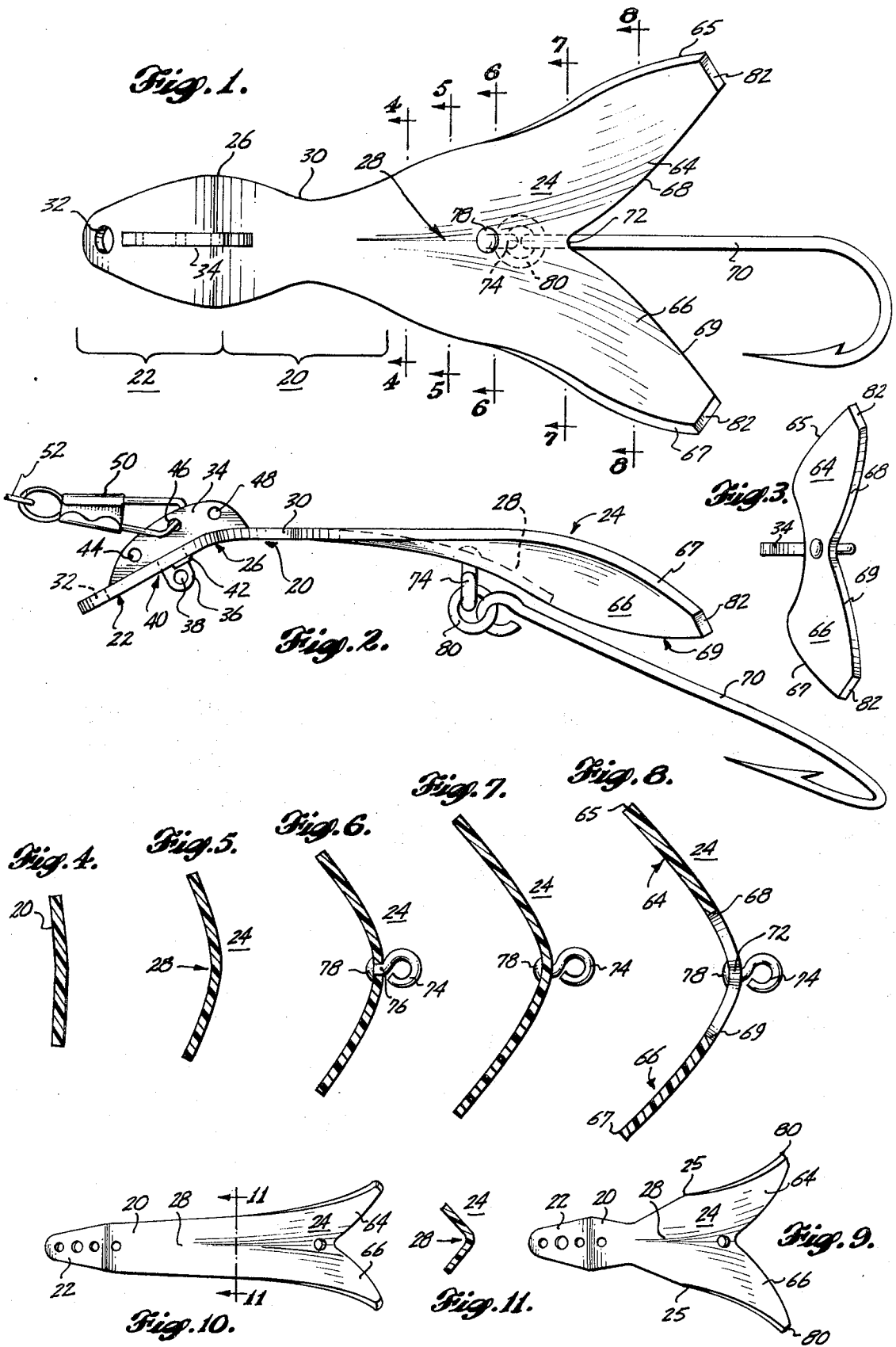

SWALLOW-TAIL FISH LURE

BACKGROUND OF THE INVENTION

1. Field of the Invention

The lures of this invention are intended for use in attracting a wide number of species of game fish and in particular trout, salmon and the like, as well as bass, perch, crappie and such fish. The lures of this invention, while usually used in trolling operations, likewise lend themselves to being cast out and retrieved in stream and pond fishing.

2. Description of the Known Prior Art

A search developed somewhat pertinent prior art, namely: Sabin, U.S. Pat. No. 2,238,604 of April 1941; Marino, U.S. Pat. No. 3,432,957 of March 1969; Bianco U.S. Pat. No. 3,497,986 of March 1970; Rustowicz U.S. Pat. No. 3,487,576 of January 1970 (not "1670" as appears on the patent); and Ogletree U.S. Pat. No. De 190,427 of May 1961. The lures of these patents are considered only similar in very general respects and they lack specific features alluded to in the abstract and more fully described structurally and functionally in the following detailed description of the invention and as claimed thereafter.

SUMMARY OF THE INVENTION

This invention is designed to provide the fisherman with a multitude of luring actions which may be obtained by variously attaching the fishing line to the lure at one of several positions provided in the lure as supplied. By reason of the combined arrangement of the various essential parts and, further, by reason of variances in their shapes, angular dispositions relative each other and their relative porportion, this lure provides several very distinctive and fish-attractive actions in moving through water. These several actions involve swimming, rolling-swimming, lateral darting, spinning, ducking, wobbling and in all respects a very lifelike reproduction of a bait fish in the water. This lure is of one piece of material and is preferably formed of sheet metal or molded plastic. The shapes and contours of the essential portions of the lure are symmetrical relative the longitudinal axis of the lure. The lure of this invention lends itself well to mass production by conventional blanking and forming steps in which are employed conventional tools and tooling practices. Hence, this lure may be inexpensively manufactured. Naturally, such a lure is desirably manufactured in a range of sizes and weights. In some instances, the form and the relative proportion of the various essential elements comprising the one-piece lure may be individually or collectively varied whereby lures having the same structural and operational features but looking different from each other are produced.

BRIEF DESCRIPTION OF THE DRAWING:

FIG. 1 is a plan view of a typical lure according to this invention;

FIG. 2 is a side elevational view of the lure of FIG. 1;

FIG. 3 is an end elevational view of the lure of FIG. 1;

FIGS. 4, 5, 6, 7 and 8 are, respectively, transverse sectional views taken in the planes indicated by lines 4—4, 5—5, 6—6, 7—7, and 8—8 of FIG. 1, all having been rotated 90° and as viewed from the right toward the left;

FIG. 9 is a top plan view of a lure similar to that of FIG. 1 but showing a modification as to shape;

FIG. 10 is a top plan view of a substantially different modification of the lure of this invention; and FIG. 11 is a transverse sectional view taken in the plane of lines 11—11 of FIG. 10.

DESCRIPTION OF A PREFERRED EMBODIMENT:

The preferred embodiment of the lure of this invention is mainly shown in FIGS. 1 through 8. It essentially comprises the body portion 20 having a down-turned head portion 22 located forwardly thereof and a bifurcated, swallow-tail, trailing portion 24 therebehind as best shown in FIGS. 1 and 2. The body portion 20 is mainly flat from about the bend 26 which is the juncture between body 20 and head 22, and rearward therefrom to the beginning of a valley 28 as indicated in FIG. 1. The head portion 22 is also substantially planar ahead of juncture 26 and, on the underside with body 20, forms an obtuse angle as shown in FIG. 2. In this preferred form of the invention the body 20 has a waist 30 about mid-way of its length. Behind the waist 30 the main body of the lure tends to flare or swell and merge smoothly into the marginal contours of the trailing portion 24.

It will be noted that the essential portions of the lure comprising the body 20, the head 22 and the trailing portion 24 are all arranged symmetrically of the longitudinal axis of the lure.

Head portion 22 has an aperture 32 at its foremost end. Rising therebehind is fin 34 which has a tongue 36 provided with an aperture 38. Tongue 36 passes through a slot 40 of head 22 and is secured in place by a keeper link 42. Fin 34 has apertures 44, 46 and 48 arrayed therein. As shown in FIG. 2, a clasp 50 of conventional design attached to fishing line 52 is engaged in the selected aperture 46.

The trailing portion 24 is generally down-turned behind body 20 and has a concavo-convex shape in the nature of a valley 28 extending rearward to the point of bifurcation 72 of the trailing portion thus producing the swallow-tail shape comprising the bifurcations or divergent portions 64 and 66 on each side of the longitudinal axis. The outer ends of the portions 64, 66 are rotated about themselves, portion 64 being turned or twisted in a counter-clockwise direction relative the longitudinal axis of the lure and portion 66 in a clockwise direction relative the same axis.

The result of the formation of the valley 28 and of the rotational shaping of divergent portions 64 and 66 is that the lure at its outer edges 65 and 67 is higher than at the respective inner edges 68 and 69 of the divergent portions 64, 66. The provision of the intermediate longitudinal extending valley 28, and this twist-shaping of the divergent portions of the swallow-tail trailing portion produce effects when the lure is drawn through the water that surprisingly are extremely lifelike and appear to be very attractive to game fish.

It will be noted from FIG. 2 that the side elevational view of the lure is extremely suggestive of the side profile view of recently and widely discussed designs of SST aircraft, inherently stable.

The effect of drawing this lure through the water can only be accurately described bearing in mind differences in the speed of draft in the water and where the line is attached to the lure.

The attachment of a hook 70 at the rear of the lure is preferably arranged to be slightly ahead of the apex 72 in the fork formed by the divergent portions 64 and 66. An eye 74 depends on the lower side of the rear portion 24 of the lure and, as shown throughout the drawings, has shank 76 provided with head 78 which secures the eye in place. A split ring coupling 80 joins with the eye 71 of hook 70 thereby attaching the hook to the lure.

Referring to FIG. 9 the lure is in many respects quite similar to that of FIG. 1 having a head portion 22, a waisted body portion 20, and the trailing portion 24 which has prominent shoulders 25 at either side. In FIG. 9 the divergent portion 64 and 66 terminate with rounded ends 80 slightly different both in shape and in function as compared with the squared-off ends 82 shown in FIGS. 1 and 2. The lure of FIG. 9 has the valley previously described and the divergent portions 64 and 66 are rotated about themselves, respectively counter-clockwise and clockwise, with regard to the longitudinal axis of the lure of FIG. 9.

With reference to the lure shown in FIG. 10, the body 20 is with proportion to the head 22 and the trailing portion 24 considerably elongated. Likewise, the trailing portion is longer than shown than in the other forms of the lure. Valley 28 is more abrupt or veed as shown in the cross section of FIG. 11. The divergent trailing element 64 and 66 are as previously described and the nose portion 22 is down-turned in similar manner to that described.

In both FIGS. 9 and 10, a series of holes is shown in the forward part of the lure for the purpose of attaching the lure variously to a trolling line. In these forms the fin 34 has been omitted and it will be understood that either a split ring will be used to affect the attachment or a swivelled eye of conventional nature would be supplied.

This lure in its various configurations as shown in the drawings may be manufactured of either sheet metal or strong durable sheet plastic material. Naturally, the metal lures will be produced by blanking and stamping operations using suitable dies. The plastic lures may likewise be blanked by the use of a die and ordinarily will be shaped by heat-forming processes well known in the art. Wtih respect to thickness, this should be sufficient that the necessary strength and rigidity characteristics are supplied to the lure to prevent it being bent or broken during either fishing or fighting a fish that may be hooked. There are available plastic sheet materials of extremely light weight having a specific gravity less than water. It is contemplated that certain models of the herein disclosed lure will be formed of such light weight plastic that it would float. In such instance when it is drawn through the water the down-turned nose portion 22 functions as a plane and the lure tends to duck somewhat below the surface as it is retrieved.

When the fishing line by means of the clasp 50 is attached at the hole 46 in fin 34 the action of the lure in the water is something like a swimming action in that the lure tends to move from side to side in a generally horizontal position with the top of the lure visible to the fisherman. This is considered one of the most desirable actions and probably affords the main action. By attaching the clasp to the lure at hole 48 a separate and distinctive action is obtained in which the lure tends to roll and at the same time to swim sideways as it is retrieved or trolled. With the line attached to the nose opening 32 at the very front of the head portion 22, the lure has a turning and wobbling motion, at the same time twisting from side to side. A fourth action is obtained by attaching the line to the opening 38 on the underside of the head portion 22 of the lure. With this arrangement the lure has a spinning action in that it tends to revolve around and around.

All of the foregoing actions are essentially produced by the combination of the relatively flat intermediate body portion 20, the substantially flat down-turned nose portion 22 and the trailing portion 24 having its concavo-convex valley 28 ending with the divergent, swallow-tail portion in which the individual divergent members are twisted or rotated as has been described. These parts appear to contribute stability to the lure as it moves through the water or the water moves relative it. By the means of the various hook-ups swimming, ducking, bobbing, wobbling, rolling, twisting, turning and similar actions may be produced to simulate in a realistic manner the evasive movement of a bait fish.

All of the characteristics described herein have made this lure an extremely effective one in attracting both the fish and the fisherman, its extreme simplicity making it possible to manufacture this lure and sell it at a price well within the range of the fisherman who, after all, is the primary object of this attractive lure. It will be apparent that the preferred embodiment and the modifications illustrated and described herein are well calculated to fullfil the above-stated object. It will be appreciated that the lure of this invention is susceptible to other modifications, variations and changes. All such as fall within the spirit of the subjoined claims are considered a part of this invention.

What is claimed is:

1. A one-piece fish lure of sheet material of uniform thickness, comprising:
   a body portion having a downturned head portion on its leading end and a downturned trailing portion therebehind;
   said body, head and trailing portions being arranged symmetrically of the longitudinal axis of the lure;
   said head portion being flat and on its underside forming an obtuse angle with said body;
   line-receiving means comprising an upstanding fin carried by said head and body portions in straddling relation to the junction therebetween;
   said downturned trailing portion being bifurcated in the shape of a swallow-tail; and
   hook-receiving means carried on the underside of said lure to the rear of said line-receiving means.

2. A lure according to claim 1 in which each divergent portion of said swallow-tail has been rotated relative the longitudinal axis of the lure so that each outer edge of a divergent portion is higher than the respective inner edge of said divergent portion.

* * * * *